US006204643B1

(12) United States Patent
Kouwa et al.

(10) Patent No.: US 6,204,643 B1

(45) Date of Patent: Mar. 20, 2001

(54) CONTROLLER FOR CAR AC GENERATOR

(75) Inventors: Tatsuki Kouwa; Keiichi Komurasaki; Hirofumi Watanabe, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,357

(22) Filed: Sep. 20, 1999

(30) Foreign Application Priority Data

Feb. 26, 1999 (JP) ........................ 11-051859

(51) Int. Cl.[7] ........................ H02P 9/14

(52) U.S. Cl. ........................ 322/28; 322/27; 322/25

(58) Field of Search ........................ 322/25, 27, 28, 322/59, 99

(56) References Cited

U.S. PATENT DOCUMENTS 5,061,889 * 10/1991 Iwatani et al. ........................ 322/28
5,157,321 * 10/1992 Kato et al. ........................ 322/28
5,184,060 * 2/1993 Iwatani ........................ 322/99
5,512,812 * 4/1996 Ono ........................ 322/28
5,563,497 10/1996 Iwatani et al. ........................ 322/99
5,719,485 * 2/1998 Asada ........................ 322/28
5,754,030 * 5/1998 Maehara et al. ........................ 322/19
5,929,613 * 7/1999 Tsuchiya et al. ........................ 322/58
6,060,866 * 5/2000 Sada et al. ........................ 322/59

OTHER PUBLICATIONS

Japanese Laid–Open Patent Application, filed Apr. 27, 1994.

* cited by examiner

*Primary Examiner*—Nicholas Ponomarenko
(74) *Attorney, Agent, or Firm*—Sughrue, Mion, Zinn, Macpeak & Seas, PLLC

(57) ABSTRACT

A controller for a car AC generator which eliminates the need for a drive signal supplied by a key switch and stabilizes the power generation of an AC generator at the start of an internal combustion engine.

The voltage regulator of the controller comprises trigger means for supplying a field current from a battery to a field coil by detecting a drop in battery voltage.

9 Claims, 4 Drawing Sheets

CONTROLLER FOR CAR AC GENERATOR

BACKGROUND OF THE INVENTION

1. Field of the Invention

The present invention relates to an apparatus for electrically controlling the output of an AC generator for use in a vehicle.

2. Description of the Prior Art

FIG. 4 is a circuit diagram of a controller for a car AC generator disclosed by Japanese Laid-open Patent Application No. 7-298515. In FIG. 4, reference numeral 1 denotes an AC generator mounted on a vehicle, which comprises an armature coil 101 for generating an AC output and a field coil 102 driven by an unshown internal combustion engine mounted on the vehicle. Denoted by 2 is a rectifier for rectifying the AC output of the AC generator 1, which comprises an output terminal 201 for the excitation of the field coil 102 and the voltage detection of a voltage regulator 3 and an output terminal 202 for grounding. The voltage regulator 3 is for controlling the output voltage of the AC generator 1 to a predetermined value. Reference numeral 4 represents a battery mounted on the vehicle, 5 a key switch and 6 a charging display lamp.

A description is subsequently given of the operation of the above controller. When the key switch 5 is closed at the start of the internal combustion engine, a base current is supplied from the battery 4 to a transistor 313 through the key switch 5, the charging display lamp 6 and a fixed resistor 301 so that the transistor 313 becomes conductive. Then, the base current is supplied to a transistor 314 through a fixed resistor 302 so that the transistor 314 becomes conductive. Thereby, the base current is supplied to a transistor 321 so that the transistor 321 becomes conductive, whereby a field current runs into the field coil 101 from the battery 4 to enable the AC generator 1 to generate power. When the internal combustion engine starts operation in this state, the field coil 102 turns and the armature coil 101 generates 3-phase AC induced electromotive force.

When the AC generator 1 begins to output a 3-phase AC, the rectifier 2 rectifies the 3-phase AC and converts it into a DC. Then, the voltage regulator 3 receives the output voltage of the output terminal 201 of the rectifier 2. When a potential divided by a fixed resistor 305 and a fixed resistor 306 exceeds a predetermined value, a zener diode 319 and a transistor 320 become conductive and a base current to the transistor 321 is cut off so that the transistor 321 becomes nonconductive, whereby a field current from the battery 4 to the field coil 102 is cutoff and the output voltage of the AC generator 1 drops.

When the output voltage of the AC generator 12 drops and the potential divided by the fixed resistor 305 and the fixed is resistor 306 falls below the predetermined value, the Zener diode 319 and the transistor 320 become nonconductive, the transistor 321 becomes conductive, a field current runs from the battery 4 to the field coil 102, and the output voltage of the AC generator 1 rises. Thus, after the start of the internal combustion engine, the voltage regulator 3 controls the output voltage of the AC generator 1 to a predetermined value by repeating the conductive state and nonconductive state of the transistor 321 alternately.

When the charging display lamp 6 is disconnected or a display lamp drive terminal gets out of place, even if the key switch 5 is closed, the transistors 314 and 314 are both nonconductive before the start of the internal combustion engine. Therefore, the transistor 321 is nonconductive. If some residual magnetic flux is existent in the field coil 102 in this state, the AC generator 1 outputs a slight amount of voltage by the start of the internal combustion engine. When the single-phase voltage of the AC generator 1 is charged into a capacitor 317 through a fixed resistor 304, the transistor 313 becomes conductive through fixed resistors 308 and 301. As a result, the transistor 314 becomes conductive, the AC generator 1 outputs a normal voltage in the same manner as during the normal operation of the charging display lamp 6, and the output voltage of the AC generator 1 is controlled to the predetermined value by the function of the voltage regulator 3.

SUMMARY OF THE INVENTION

Since the controller for a car AC generator of the prior art is constituted as described above, when the AC generator 1 is not used for power generation for a long time and there is almost no residual magnetic flux in the field coil 102 while the charging display lamp 6 for driving the voltage regulator 3 is disconnected or the charging display lamp drive terminal gets out of place, the AC generator 1 does not start power generation even if the AC generator 1 is driven properly by the internal combustion engine.

It is therefore an object of the present invention to provide a controller for a car AC generator which enables an AC generator to generate power stably by the start of an internal combustion engine.

According to a first aspect of the present invention, there is provided a controller for a car AC generator, which comprises an AC generator driven by the internal combustion engine of a vehicle, a rectifier for rectifying the AC output of the AC generator, a battery which is charged with the rectified output of the rectifier and supplies power to the field coil of the AC generator at the start of the internal combustion engine and a voltage regulator for adjusting the output voltage of the generator to a predetermined value by controlling a field current to be supplied to the field coil from the battery intermittently, wherein the voltage regulator comprises trigger means for supplying a field current from the battery to the field coil when it detects a drop in battery voltage.

According to a second aspect of the present invention, there is provided a controller for a car AC generator, wherein the trigger means comprises means for supplying a field current from the battery to the field coil when it detects a potential difference between a reduced battery voltage and its delayed voltage.

According to a third aspect of the present invention, there is provided a controller for a car AC generator, wherein the trigger means comprises means for keeping the supply of a field current to the field coil when there is a single-phase output from the AC generator after the detection of a drop in battery voltage and cutting off a field current to the field coil after the passage of a predetermined time when there is no single-phase output from the AC generator.

According to a fourth aspect of the present invention, there is provided a controller for a car AC generator, wherein the trigger means comprises means for keeping the supply of a field current to the field coil when the frequency of the single-phase output of the AC generator is equal to or larger than a predetermined value and cutting off a field current to the field coil after the passage of a predetermined time when the frequency of the single-phase output of the AC generator is smaller than the predetermined value.

According to a fifth aspect of the present invention, there is provided a controller for a car AC generator, wherein the trigger means comprises means for making conductive a switching element for intermittently supplying a field current for a predetermined time after the detection of a drop in battery voltage.

According to a sixth aspect of the present invention, there is provided a controller for a car AC generator, wherein the trigger means is independent of other excitation circuits.

According to a seventh aspect of the present invention, there is provided a controller for a car AC generator, wherein the trigger means comprises means for annulling the function of supplying a field current to the field coil by the detection of a drop in battery voltage when there is a single-phase output from the AC generator.

According to an eighth aspect of the present invention, there is provided a controller for a car AC generator, wherein the trigger means comprises means for annulling the function of supplying a filed current to the field coil by the detection of a drop in battery voltage when the frequency of the single-phase output of the AC generator is equal to or larger than a predetermined value.

According to a ninth aspect of the present invention, there is provided a controller for a car AC generator, wherein the trigger means is invalidated when other excitation control circuit for voltage control is activated.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Figure 1:
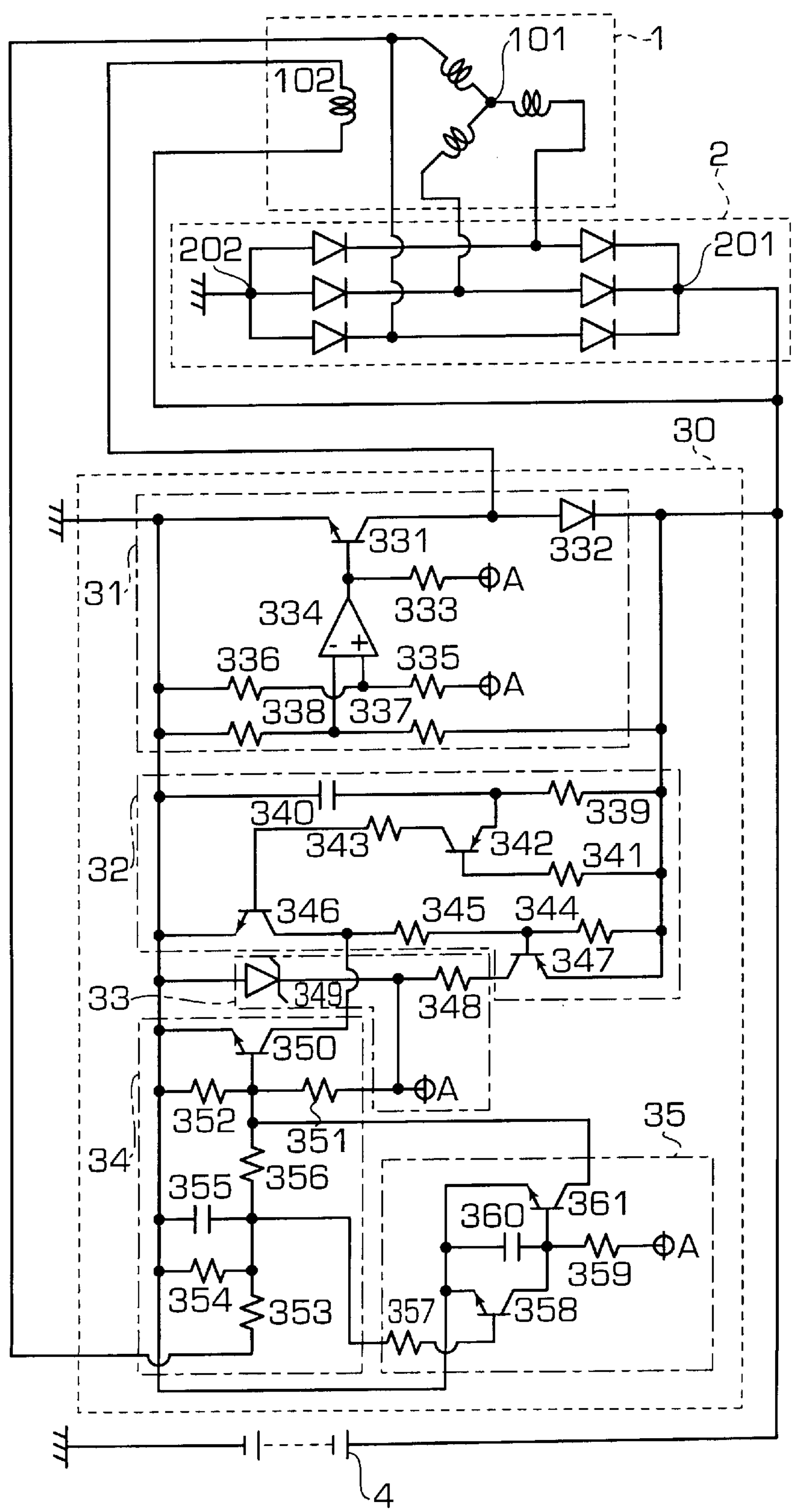
FIG. 1 is a circuit diagram of Embodiment 1 of the present invention.
Figure 4:
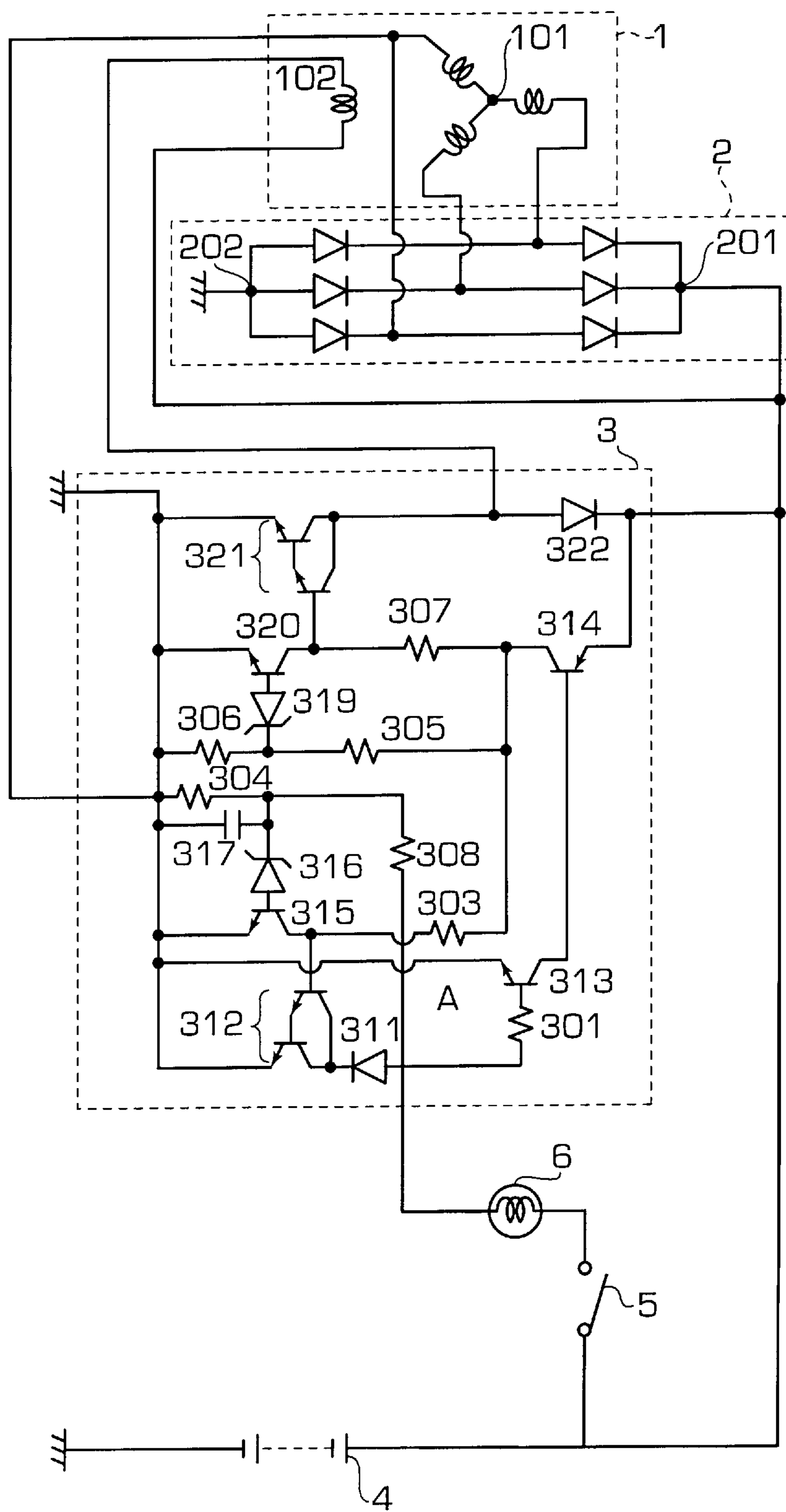
FIG. 4 is a circuit diagram of a controller for a car AC generator of the prior art.

FIG. 1 is a circuit diagram of a controller for a car AC generator according to Embodiment 1 of the present invention. In FIG. 1, the AC generator 1, the rectifier 2 and the battery 4 are the same as those of the prior art. However, the constitution of a voltage regulator 30 is different from that of the prior art and the key switch 5 and the charging display lamp 6 of FIG. 4 are eliminated. The voltage regulator 30 comprises a voltage control circuit 31, a power trigger circuit 32, a power circuit 33, a power holding circuit 34 and a power reset circuit 35. The voltage control circuit 31 comprises fixed resistors 333, 335, 336, 337 and 338, a comparator 334, a transistor 331, a diode 332 and a power output point A. The power trigger circuit 32 comprises fixed resistors 339, 341, 343, 344 and 345, a capacitor 340 and transistors 342, 346 and 347. The power circuit 33 comprises a fixed resistor 348, a Zener diode 349 and a power output point A. The power holding circuit 34 comprises fixed resistors 351, 352, 353, 354 and 356, a capacitor 355 and a transistor 350. The power reset circuit 35 comprises fixed resistors 357 and 359, a capacitor 360, transistors 358 and 361 and a power output point A. The power output points A are not existent independently but are connected to one another and illustrated as a connector for specifying the output point of the power circuit 33.

A description is subsequently given of the operation of Embodiment 1 of the present invention. A vehicle loaded with ca 12V system battery as the battery 4 is assumed. When an unshown key switch not mounted on the vehicle and removed from the circuit of Embodiment 1 is closed at the start of an unshown internal combustion engine and a starter for starting the internal combustion engine starts operation, the starter consumes a huge amount of power. Therefore, the voltage of the battery which generates a voltage of 13 V when it is charged properly before the start of the starter is greatly reduced to 5 to 8 V instantaneously (in several milliseconds to several tens of milliseconds). This reduced voltage is applied to the base of the transistor 342 through the fixed resistor 341 of the power trigger circuit 32. At the same time, the reduced voltage is delayed by the fixed resistor 339 and the capacitor 340 and given to the emitter of the transistor 342. Paying attention to the base voltage of the transistor 342 through the fixed resistor 341 and the emitter voltage of the transistor 342 through the fixed resistor 339, at the start of the starter, a potential difference is produced between the base and the emitter of the resistor 342 by a great drop in battery voltage and the transistor 342 becomes conductive. Thereby, a base current is supplied to the transistor 346 through the fixed resistor 343 so that the transistor 346 becomes conductive. When the base potential of the transistor 347 drops through the fixed resistor 345, the transistor 347 becomes conductive.

When the power trigger circuit 32 is thus driven, the power circuit 33 connected to the trigger output terminal of the power trigger circuit 32 is activated. That is, in the power circuit 33, a fixed voltage is output to the power output point A by the fixed resistor 348 and the Zener diode 349. The output of the power output point A is divided by the fixed resistor 351 and the fixed resistor 352 of the power holding circuit 34 and the divided voltage is applied to the base of the transistor 350 so that the transistor 350 becomes conductive. Thereby, the base potential of the transistor 347 is reduced through the fixed resistor 345 of the power trigger circuit 32. Therefore, the voltage of the power output point A is maintained at a fixed value. By maintaining the power output point A at a fixed value, the transistor 331 of the voltage control circuit 31 becomes conductive through the fixed resistor 333. A field current runs from the battery 4 to the field coil 102 to enable the AC generator 1 to generate power.

When the internal combustion engine starts operation in this state, the AC generator 1 starts to generate power and the voltage regulator 30 receives the output voltage of the output terminal 201 of the rectifier 2. In the voltage control circuit 31, when a potential divided by the fixed resistor 337 and the fixed resistor 338 exceeds a potential divided by the fixed resistor 335 and the fixed resistor 336 at the power output point A, the output voltage of the comparator 334 changes from a high voltage Hi to a low voltage Lo, a base current for the transistor 331 is cut off, and the transistor 331 becomes nonconductive. Thereby, a field current from the battery 4 to the field coil 102 is cut of f and the output voltage of the Ac generator 1 drops.

When the potential divided by the fixed resistors 337 and 338 of the voltage control circuit 31 falls below the potential divided by the fixed resistors 335 and 336 while the output voltage of the AC generator 1 drops, the output voltage of the comparator 334 changes from a low potential Lo to a high potential Hi, the transistor 331 becomes conductive, a field current runs from the battery 4 to the field coil 102, and the output voltage of the AC generator 1 rises. Thus, after the start of the internal combustion engine, the output voltage of the AC generator 1 is controlled to a predetermined value by repeating the conductive state and nonconductive state of the transistor 331 alternately. A surge generated when the transistor 331 changes from conductive to nonconductive is absorbed by the diode 332.

While the AC generator 1 generates power, a base current is supplied to the transistor 350 through the fixed resistor 356 by charging the capacitor 355 with the single-phase output voltage of the AC generator 1 through the fixed resistors 353 and 354 of the power holding circuit 34. Therefore, the power output point A is maintained at a fixed voltage with the single-phase output of the AC generator 1. In the power reset circuit 35, the capacitor 360 is thereby charged for a predetermined time of several seconds from the power output point A through the fixed resistor 359. However,the transistor 358 becomes conductive with a base current supplied from the charged capacitor 355 of the power holding circuit 34 through the fixed resistor 357. Since the capacitor 360 is grounded by the transistor 358, the transistor 361 is nonconductive. Therefore, the power reset circuit 35 does not operate and a stable fixed voltage is supplied to the power output point A while the AC generator 1 generates power properly.

Meanwhile, when it becomes unnecessary to supply a fixed voltage to the power output point A by the suspension of the internal combustion engine or when a fixed voltage is output to the power output point A by the erroneous operation of the transistor 342 of the power trigger circuit 32 by noise or the like during the suspension of the internal combustion engine, the transistor 350 of the power holding circuit 34 becomes conductive, and when the power output point A is maintained at a fixed voltage, the transistor 331 becomes conductive, a field current runs from the battery 4 to the field coil 102, and the battery voltage drops, causing the death of the battery 4.

In Embodiment 1, when there is no output voltage from the AC generator 1 after the passage of a predetermined time though a fixed voltage is output to the power output point A, the power reset circuit 35 operates to prevent the death of the battery. That is, since there is no single-phase output from the AC generator 1, in the power reset circuit 35, the transistor 358 is nonconductive, the capacitor 360 is charged from the power output point A through the fixed resistor 359 for a predetermined time, and the transistor 361 becomes conductive. Thereby, the transistor 350 of the power holding circuit 34 becomes nonconductive and a fixed voltage is not output to the power output point A of the power circuit 33. Therefore, the transistor 331 of the voltage control circuit 31 becomes nonconductive and a field current from the battery 4 to the field coil 102 is cut off, thereby making it possible to prevent the death of the battery.

Embodiment 2

Figure 2:
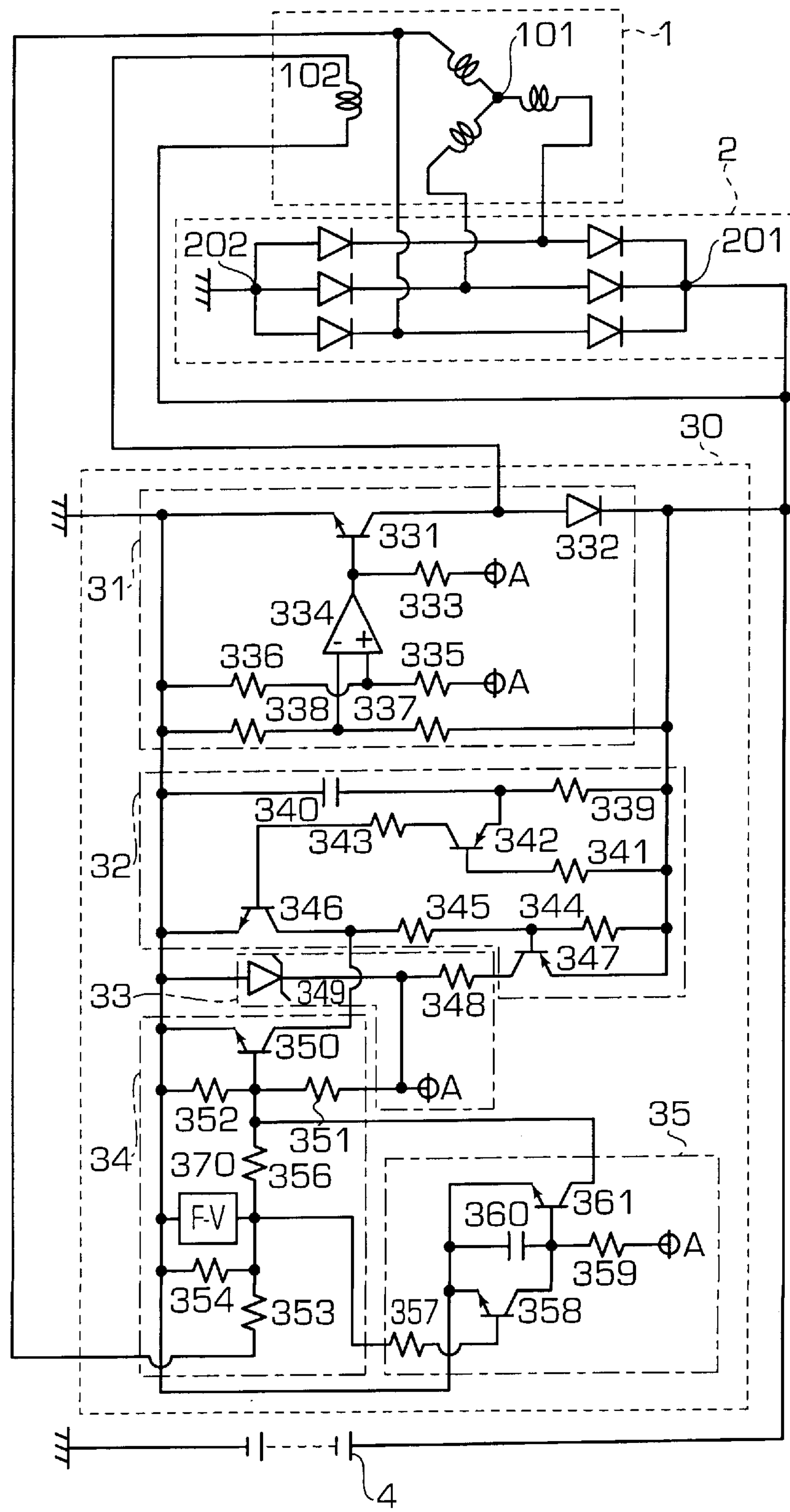
FIG. 2 is a circuit diagram of Embodiment 2 of the present invention.

FIG. 2 is a circuit diagram of a controller for a car AC generator according to Embodiment 2 of the present invention. In FIG. 2, the capacitor 355 (see FIG. 1) of the power holding circuit 34 in Embodiment 1 is replaced by an F-V converter 370 so that when the frequency of the single-phase output of the AC generator 1 becomes equal to or larger than a predetermined value, a fixed voltage output to the power output point A is maintained by the operation of the power trigger circuit 35 and when the frequency of the single-phase output of the AC generator 1 becomes smaller than the predetermined value, the fixed voltage output to the power output point A is canceled by the operation of the power trigger circuit 35.

A description is subsequently given of the operation of Embodiment 2 of the present invention. When the power output point A outputs a fixed voltage, the internal combustion engine starts operation, and the AC generator 1 begins to generate power, the single-phase output of the AC generator 1 is transmitted to the F-V converter 37 through the fixed resistors 353 and 354 of the power holding circuit 34, and the F-V converter 370 outputs a voltage proportional to the frequency. When the single-phase output of the AC generator is equal to or larger than a predetermined frequency, the F-V converter 370 outputs a high potential Hi and when the single-phase output of the AC generator is smaller than the predetermined frequency, the F-V converter 370 outputs a low potential Lo. As a result, the AC generator 1 generates power properly. When the frequency of the single-phase output of the AC generator 1 is equal to or larger than a predetermined value, the transistor 350 of the power holding circuit 34 and the transistor 358 of the power reset circuit 35 are both conductive. Thereby, the capacitor 360 of the power reset circuit 35 is not charged, and the transistor 361 remains nonconductive. Therefore, the power output point A is maintained at a fixed voltage.

When the internal combustion engine stops operation and the power generation of the AC generator 1 stops, the frequency of the single-phase output of the AC generator 1 falls below the predetermined value, the output voltage of the F-V converter 370 becomes a low potential Lo and the transistor 358 of the power reset circuit 35 becomes nonconductive. Thereby, the capacitor 360 of the power reset circuit 35 is charged through the fixed resistor 359 for a predetermined time, the transistor 361 becomes conductive, and the transistor 350 becomes nonconductive. Thereby, the output of the power output point A is cut off.

Embodiment 3

Figure 3:
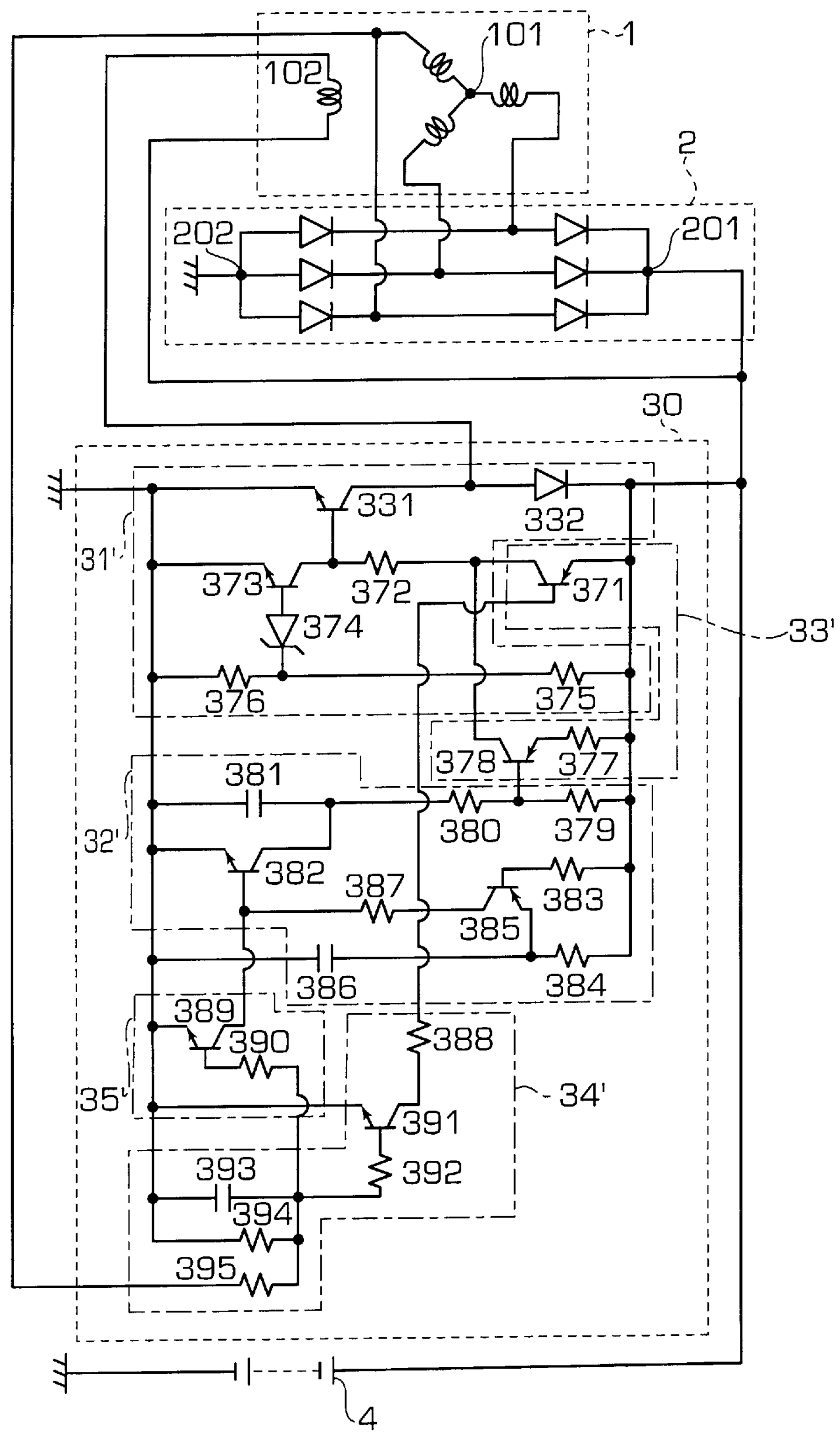
FIG. 3 is a circuit diagram of Embodiment 3 of the present invention.

FIG. 3 is a circuit diagram of a controller for a car AC generator according to Embodiment 3 of the present invention. In FIG. 3, a voltage regulator 30', voltage control circuit 31', excitation trigger circuit 32', excitation circuit 33', excitation holding circuit 34' and excitation trigger canceling circuit 35' differ from those of FIG. 1 and FIG. 2 in constitution.

The voltage control circuit 31' comprises fixed resistors 372, 375 and 376, transistors 331 and 373, a Zener diode 374 and a diode 332. The excitation trigger circuit 32' comprises fixed resistors 383, 384, 387, 379 and 380, capacitors 381 and 386, and transistors 385 and 382. The excitation circuit 33' comprises a fixed resistor 377 and transistors 371 and 378. The excitation holding circuit 34' comprises fixed resistors 388, 392, 394 and 395, a capacitor 393 and a transistor 391. The excitation trigger canceling circuit 35' comprises a fixed resistor 390 and a transistor 389.

A description is subsequently given of the operation of Embodiment 3. When the unshown starter is activated to start the internal combustion engine of the vehicle and the voltage of the battery greatly drops, the base voltage of the transistor 385 greatly drops through the fixed resistor 383 of the excitation trigger circuit 32'. At the same time, the reduced voltage of the battery 4 is delayed by the fixed resistor 384 and the capacitor 386 and given to the emitter of the transistor 385. Paying attention to the base voltage of the transistor 385 through the fixed resistor 383 and the emitter voltage of the transistor 385 through the fixed resistor 384, since the emitter voltage of the transistor 385 drops more slowly than the base voltage at the start of the starter, a potential difference is produced between the base and the emitter of the transistor 385, and the transistor 385 becomes conductive.

When the excitation trigger circuit 32' is thus driven, the excitation circuit 33' connected to the trigger output terminal of the excitation trigger circuit 32' is activated. That is, a base current is supplied to the transistor 382 through the fixed resistor 387 in the excitation trigger circuit 32' so that the transistor 382 becomes conductive. Thereby, the capacitor 381 charged at the time of the suspension of the internal combustion engine is grounded and discharges electricity instantaneously. The base potential of the transistor 378 of the excitation circuit 33' divided by the fixed resistor 379 and the fixed resistor 380 is reduced by the discharge of the capacitor 381. Therefore, a potential difference is produced between the emitter potential and the base potential of the transistor 378, and the transistor 378 becomes conductive. A base current is supplied to the transistor 331 through the fixed resistor 372 so that the transistor 331 becomes conductive. Thereby, a field current runs from the battery 4 to the field coil 102 to enable the AC generator 1 to generate power.

When the internal combustion engine is not started properly and the AC generator 1 does not generate power, if the down time of the AC generator 1 exceeds a delay time set by the capacitor 386, the transistor 385 and the transistor 382 of the excitation trigger circuit 32' become. nonconductive. Therefore, the capacitor 381 is charged for a predetermined time through the fixed resistors 379 and 380 of the excitation trigger circuit 32'. Thereby, the transistor 378 of the excitation circuit 33' becomes nonconductive and the transistor 331 of the voltage control circuit 31' becomes nonconductive. As a result, a field current from the battery 4 to the field coil 102 is cut off, thereby making it possible to prevent the death of the battery.

While power is supplied to the starter from the battery 4 after the AC generator 1 is enabled to generate power, the internal combustion engine starts operation, the AC generator 1 begins to generate power, and the capacitor 393 is charged with the single-phase output voltage of the AC generator 1 through the fixed resistors 395 and 394 of the excitation holding circuit 34'. When the capacitor 393 is charged with a voltage more than a predetermined value, the transistor 391 of the excitation holding circuit 34' becomes conductive through the fixed resistor 392. Thereby, the base potential of the transistor 371 of the excitation circuit 33' drops and the transistor 371 becomes conductive, whereby the base current of the transistor 331 can be supplied through the fixed resistor 372 of the voltage control circuit 31'. At the same time, the transistor 389 of the excitation trigger circuit 35' becomes conductive through the fixed resistor 390 by charging the capacitor 393 with a voltage more than the predetermined value. Thereby, the base of the transistor 382 of the excitation trigger circuit 32' is grounded and the transistor 382 is kept nonconductive. As a result, the function of supplying a field current to the field coil 102 from the battery 4 by the detection of a drop in battery voltage is annulled.

When the internal combustion engine is driven, power supply from the battery 4 to the starter is stopped, the output voltage of the battery, 4 returns to a normal level and the AC generator 1 generates power, the voltage regulator 3 receives the output voltage of the output terminal 201 of the rectifier 2. When a potential divided by the fixed resistor 375 and the fixed resistor 376 of the voltage control circuit 31' exceeds the threshold value of the Zener diode 374, the transistor 373 becomes conductive and a base current for the transistor 331 is cutoff. Thereby, the transistor 331 becomes nonconductive, a field current from the battery 4 to the field coil 102 is cut i off, and the power voltage of the AC generator 1 drops. When the output voltage of the AC generator 1 drops, the potential divided by the fixed resistors 375 and 376 also drops, the Zener diode 374 and the transistor 373 become nonconductive, the transistor 331 becomes conductive, a field current runs from the battery 4 to the field coil 102, and the output voltage of the AC generator 1 rises. The output of the AC generator 1 is controlled to a predetermined value by repeating this operation.

When the internal combustion engine stops operation, the power generation of the AC generator 1 also stops and there is no single-phase output from the AC generator 1. Therefore, the transistor 389 of the excitation trigger canceling circuit 35' and the transistor 391 of the excitation trigger canceling circuit 35' become both nonconductive. Thereby, the transistor 371 of the excitation circuit 33' becomes nonconductive, the transistor 378 becomes nonconductive after the passage of a predetermined time, the transistor 331 becomes nonconductive, and a field current from the battery 4 to the nonconductive, and a field current from the battery 4 to the field coil 102 is cut off, thereby making it possible to prevent the death of the battery.

Embodiment 4

The present invention can also be applied when the capacitor 393 of the excitation holding circuit 34' in FIG. 3 is replaced by an F-V converter 374 shown in FIG. 2.

As having been described above, according to the first aspect of the present invention, since a field current is supplied from the battery to the field coil when a drop in battery voltage is detected, a drive signal for driving the vehicle supplied by the key switch before the start of the internal combustion engine is not necessary and the AC generator is always able to begin stable power generation.

According to the second aspect of the present invention, since a field current is supplied from the battery to the field coil when a potential difference is produced between a reduced battery voltage and its delayed voltage, a semiconductor device such as a transistor can be used as a device for producing a potential difference between the reduced voltage and its delayed voltage.

According to the third aspect of the present invention, when there is a single-phase output from the AC generator after the detection of a drop in battery voltage, the supply of a field current from the battery to the field coil is kept, and when there is no single-phase output from the AC generator, a field current from the battery to the field coil is cut off after the passage of a predetermined time, thereby making it possible to prevent the death of the battery after the suspension of the internal combustion engine.

According to the fourth aspect of the present invention, when the frequency of the single-phase output of the AC generator is equal to or larger than a predetermined value after the detection of a drop in battery voltage, the supply of a field current from the battery to the field coil is kept and when the frequency of the single-phase output of the AC generator is smaller than the predetermined value, a field current from the battery to the field coil is cut off after the passage of a predetermined time, thereby making it possible to prevent the death of the battery.

According to the fifth aspect of the present invention, since a field current to be supplied from the battery to the field coil is caused to flow for a predetermined time by the detection of a drop in battery voltage, the AC generator can start power generation simultaneously with the start of the internal combustion engine.

According to the sixth aspect of the present invention, since the trigger means is independent of other circuits connected to the battery, the circuit configuration of the voltage regulator can be simplified and the operation of the voltage regulator can be stabilized.

According to the seventh aspect of the present invention, when there is a single-phase output voltage from the AC generator, the function of supplying a field current from the battery to the field coil by the detection of a drop in battery voltage is annulled. Therefore, the operation of the voltage regulator can be stabilized.

According to the eighth aspect of the present invention, when the frequency of the single-phase output of the AC generator is equal to or larger than a predetermined value, the function of supplying a field current from the battery to the field coil by the detection of a drop in battery voltage is annulled. Therefore, the operation of the voltage regulator can be stabilized.

According to the ninth aspect of the present invention, when other excitation control circuit of the voltage regulator is activated, the function of supplying a field current from the battery to the field coil is annulled by the detection of a drop in battery voltage. Therefore, the operation of the voltage regulator can be stabilized.

What is claimed is:

1. A controller for a car AC generator comprising:

an AC generator driven by the internal combustion engine of a vehicle;

a rectifier for rectifying the AC output of the AC generator;

a battery which is charged with the rectified output of the rectifier and supplies power to the field coil of the AC generator at the start of the internal combustion engine; and a voltage regulator for adjusting the output voltage of the AC generator to a predetermined value by controlling a field current to be supplied to the field coil from the battery intermittently, wherein the voltage regulator comprises trigger means for supplying a field current from the battery to the field coil when it detects a drop in battery voltage.

2. The controller for a car AC generator according to claim 1, wherein the trigger means comprises means for supplying a field current from the battery to the field coil when it detects a potential difference between a reduced battery voltage and its delayed voltage.

3. The controller for a car AC generator according to claim 1, wherein the trigger means comprises means for keeping the supply of a field current to the field coil when there is a single-phase output from the AC generator and cutting off the field current to the field coil after the passage of a predetermined time when there is no single-phase output from the AC generator after the detection of a drop in battery voltage.

4. The controller for a car AC generator according to claim 1, wherein the trigger means comprises means for keeping the supply of a field current to the field coil when the frequency of the single-phase output of the AC generator is equal to or larger than a predetermined value and cutting off the field current to the field coil after the passage of a predetermined time when the frequency of the single-phase output of the AC generator is smaller than the predetermined value after the detection of a drop in battery voltage.

5. The controller for a car AC generator according to claim 1, wherein the trigger means comprises means for making conductive a switching element for intermittently supplying a field current for a predetermined time after the detection of a drop in battery voltage.

6. The controller for a car AC generator according to claim 1, wherein the trigger means is independent of other excitation circuits.

7. The controller for a car AC generator according to claim 1, wherein the trigger means comprises means for annulling the function of supplying a filed current to the field coil by the detection of a drop in battery voltage when there is a single-phase voltage output from the AC generator.

8. The controller for a car AC generator according to claim 1, wherein the trigger means comprises means for annulling the function of supplying a field current to the field coil by the detection of a drop in battery voltage when the frequency of the single-phase output of the AC generator is equal to or larger than a predetermined value.

9. The controller for a car AC generator according to claim 1, wherein the trigger means is invalidated when other excitation control circuit for voltage control is activated.

* * * * *